US009574388B2

(12) United States Patent
Ebert

(10) Patent No.: US 9,574,388 B2
(45) Date of Patent: Feb. 21, 2017

(54) CONTROL SYSTEM FOR A MOTORIZED CLOSURE ELEMENT ARRANGEMENT OF A MOTOR VEHICLE

(71) Applicant: Brose Fahrzeugteile GmbH & Co. KG, Hallstadt, Hallstadt (DE)

(72) Inventor: Frank Ebert, Memmelsdorf (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 74 days.

(21) Appl. No.: 14/581,441

(22) Filed: Dec. 23, 2014

(65) Prior Publication Data

US 2015/0176324 A1 Jun. 25, 2015

(30) Foreign Application Priority Data

Dec. 25, 2013 (DE) .......................... 10 2013 114881

(51) Int. Cl.
*B62D 25/12* (2006.01)
*E05F 15/73* (2015.01)
*E05F 15/60* (2015.01)

(52) U.S. Cl.
CPC ................ *E05F 15/73* (2015.01); *E05F 15/60* (2015.01); *E05Y 2900/548* (2013.01)

(58) Field of Classification Search
CPC ............. E05F 15/46; B62D 25/12; G01D 5/24
See application file for complete search history.

(56) References Cited

U.S. PATENT DOCUMENTS 5,844,486 A 12/1998 Kithil et al.
6,275,146 B1 8/2001 Kithil et al.
(Continued)

FOREIGN PATENT DOCUMENTS

DE 10235925 2/2004
DE 10254708 6/2004
(Continued)

OTHER PUBLICATIONS

Brose Fahrzeugteile Gmbh & Co.KG, "Sesam oeffne Dich. In: AutomobilKONSTRUKTION," Feb. 2012 (pp. 50-51), with English translation (4 pages).

(Continued)

*Primary Examiner* — Thomas Tarcza
*Assistant Examiner* — Alex C Dunn
(74) *Attorney, Agent, or Firm* — Pauly, Devries Smith & Deffner, LLC

(57) ABSTRACT

Disclosed herein is a control system for driving a motorized closure element arrangement of a vehicle, wherein at least one linear distance sensor, is provided in order to detect operator control events in the form of operator movement cycles, wherein, as part of an operator control event monitoring process, a control arrangement monitors the at least one distance sensor in order to check whether a predetermined operator control event is present, wherein a longitudinal movement of a body part of an operator in the longitudinal direction can additionally be detected by means of the at least one distance sensor. It is proposed that the control arrangement detects a predetermined longitudinal movement cycle, which runs in the longitudinal direction, of a body part of an operator as an operator control event as part of the operator control event monitoring process and drives the closure element arrangement in response.

20 Claims, 4 Drawing Sheets

(56) References Cited

U.S. PATENT DOCUMENTS

| | | | | |
|---|---|---|---|---|
| 6,478,357 | B2 * | 11/2002 | Zhou | E05B 83/16 296/56 |
| 7,880,481 | B2 | 2/2011 | Zangl et al. | |
| 8,027,769 | B2 * | 9/2011 | Oualkadi | E05F 15/41 296/146.4 |
| 8,225,458 | B1 * | 7/2012 | Hoffberg | E05F 3/102 16/49 |
| 8,284,022 | B2 | 10/2012 | Kachouh | |
| 8,606,467 | B2 | 12/2013 | Gehin | |
| 8,788,152 | B2 | 7/2014 | Reimann et al. | |
| 9,081,032 | B2 | 7/2015 | Lange | |
| 9,283,994 | B2 | 3/2016 | Holzberg et al. | |
| 9,290,982 | B2 | 3/2016 | Schuetz et al. | |
| 2002/0030666 | A1 | 3/2002 | Philipp | |
| 2002/0143452 | A1 | 10/2002 | Losey | |
| 2004/0085079 | A1 | 5/2004 | Lin et al. | |
| 2004/0178924 | A1 | 9/2004 | Gifford et al. | |
| 2005/0114276 | A1 | 5/2005 | Hunter et al. | |
| 2005/0231194 | A1 | 10/2005 | Baldi et al. | |
| 2006/0267374 | A1 | 11/2006 | Jackson et al. | |
| 2006/0293800 | A1 | 12/2006 | Bauer et al. | |
| 2007/0072154 | A1 | 3/2007 | Akatsuka et al. | |
| 2008/0068145 | A1 | 3/2008 | Weghaus et al. | |
| 2008/0088188 | A1 * | 4/2008 | Busch | H02K 41/031 310/68 B |
| 2008/0195273 | A1 | 8/2008 | Matsuura et al. | |
| 2008/0303685 | A1 * | 12/2008 | Nakano | H03K 17/955 340/686.6 |
| 2009/0222174 | A1 | 9/2009 | Frommer et al. | |
| 2009/0243826 | A1 | 10/2009 | Touge | |
| 2010/0256875 | A1 | 10/2010 | Gehin | |
| 2011/0118946 | A1 | 5/2011 | Reimann et al. | |
| 2011/0234370 | A1 | 9/2011 | Briese et al. | |
| 2011/0276234 | A1 | 11/2011 | Van Gastel | |
| 2011/0313619 | A1 | 12/2011 | Washeleski et al. | |
| 2012/0188078 | A1 | 7/2012 | Soles et al. | |
| 2012/0290177 | A1 | 11/2012 | Wagenhuber et al. | |
| 2013/0311039 | A1 | 1/2013 | Passani et al. | |
| 2013/0234733 | A1 | 9/2013 | Lange | |
| 2013/0234828 | A1 | 9/2013 | Holzberg et al. | |
| 2014/0032055 | A1 * | 1/2014 | Holzberg | B62D 25/12 701/49 |
| 2014/0195073 | A1 | 7/2014 | Herthan | |
| 2014/0285217 | A1 | 9/2014 | Van Gastel et al. | |
| 2014/0324273 | A1 | 10/2014 | Russ et al. | |
| 2014/0373447 | A1 | 12/2014 | Gunreben et al. | |
| 2015/0019085 | A1 | 1/2015 | Ma | |
| 2015/0128497 | A1 | 5/2015 | Schuetz et al. | |
| 2015/0134208 | A1 | 5/2015 | Gunreben | |
| 2015/0176322 | A1 | 6/2015 | Wuerstlein et al. | |
| 2015/0176323 | A1 | 6/2015 | Ebert | |
| 2015/0233167 | A1 | 8/2015 | Natsui et al. | |
| 2015/0258879 | A1 | 9/2015 | Mandzak | |
| 2015/0345205 | A1 | 12/2015 | Gunreben et al. | |

FOREIGN PATENT DOCUMENTS

| | | |
|---|---|---|
| DE | 102004055982 | 6/2006 |
| DE | 102004057220 | 6/2006 |
| DE | 102005042402 | 3/2007 |
| DE | 102005055002 | 5/2007 |
| DE | 202005020140 | 6/2007 |
| DE | 10158533 | 2/2009 |
| DE | 102009004384 | 7/2009 |
| DE | 102008041354 | 2/2010 |
| DE | 102009004155 | 6/2010 |
| DE | 102009047066 | 5/2011 |
| DE | 102009055778 | 6/2011 |
| DE | 102010048144 | 7/2011 |
| DE | 102010006213 | 8/2011 |
| DE | 102010002559 | 9/2011 |
| DE | 102011112274 | 3/2013 |
| DE | 102012013065 | 2/2014 |
| DE | 102013114881 | 6/2015 |
| EP | 0711977 | 5/1996 |
| EP | 1422366 | 5/2004 |
| FR | 2943190 | 9/2010 |
| GB | 2376075 | 12/2002 |
| JP | 02055168 | 2/1990 |
| JP | 6018547 | 1/1994 |
| JP | 2007228640 | 9/2007 |
| JP | 2009079353 | 4/2009 |
| JP | 20100236184 | 10/2010 |
| WO | 2005084979 | 9/2005 |
| WO | 2007/006514 | 1/2007 |
| WO | 2010076332 | 7/2010 |
| WO | 2011092206 | 8/2011 |
| WO | 2012052210 | 4/2012 |
| WO | 2012/084111 | 6/2012 |
| WO | 2013034252 | 3/2013 |
| WO | 2013091839 | 6/2013 |

OTHER PUBLICATIONS

European Search Report for EP Application No. 13713812.2 corresponding to U.S. Appl. No. 13/951,163 dated Oct. 31, 2013 (3 pages).

German Search Report for DE Application No. 102011112274.9 corresponding to U.S. Appl. No. 14/343,005, mailed May 9, 2012 (4 pages).

German Search Report for German Patent Application No. 102013114883.2, mailed on Feb. 2, 2014 (5 pages).

International Search Report and Written Opinion for PCT/EP2013/063905 related to U.S. Appl. No. 14/412,511, mailed Aug. 1, 2013 (8 pages) [English Translation].

International Search Report for application No. PCT/EP2013/066998 corresponding to U.S. Appl. No. 14/343,005, mailed Oct. 26, 2012 (6 pages).

International Search Report for PCT/EP2012/005234 related to U.S. Appl. No. 14/367,786, mailed Jun. 14, 2013 (3 pages).

International Written Opinion for PCT/EP2012/005234 related to U.S. Appl. No. 14/367,786, completed Jun. 7, 2014 (10 pages).

Non Final Office Action Citation for U.S. Appl. No. 14/367,786 mailed Feb. 1, 2016 (15 pages).

Non Final Office Action for U.S. Appl. No. 14/343,005, mailed Feb. 11, 2016 (23 pages).

Non Final Office Action for U.S. Appl. No. 13/951,163, mailed on Dec. 17, 2014 (31 pages).

Non-Final Office Action for U.S. Appl. No. 14/412,511, mailed Apr. 11, 2016 (20 pages).

Notice of Allowance for U.S. Appl. No. 13/951,163, mailed Nov. 6, 2015 (13 pages).

Office Action for KR Patent Application No. 10-2013-0087175 corresponding to U.S. Appl. No. 13/951,163 completed Jan. 21, 2015 (13 pages).

Search Report for German Application No. 102012014676.0 corresponding to U.S. Appl. No. 13/951,163, mailed Jan. 18, 2013 (5 pages).

Search Report for German Patent Application No. 102012013065.1 related to U.S. Appl. No. 14/412,511, mailed Jun. 28, 2013 (5 pages).

* cited by examiner

CONTROL SYSTEM FOR A MOTORIZED CLOSURE ELEMENT ARRANGEMENT OF A MOTOR VEHICLE

CLAIM OF PRIORITY

This application claims the benefit of German Patent Application No. DE 10 2013 114 881.6, filed Dec. 25, 2013, the disclosure of which is incorporated by reference herein in its entirety.

FIELD OF THE TECHNOLOGY

Embodiments of the invention relate to a control system for a motorized closure element arrangement of a motor vehicle, and to a distance sensor arrangement.

BACKGROUND

Modern motor vehicles increasingly have motorized closure element arrangements having at least one closure element. Said closure elements may be, for example, doors, in particular sliding doors, hatches, in particular tailgates, boot lids, engine hoods, cargo space floors or the like, of a motor vehicle. In this respect, the term “closure element” has a broad meaning in the present case. The closure element generally has an associated drive arrangement which can serve for the motorized adjustment of the closure element, the motorized opening of a motor vehicle lock of the closure element, or the like.

One convenience function which is becoming increasingly important today is the automatic operation of the motorized tailgate of a motor vehicle. The known control system (DE 10 2011 112 274 A1) on which the invention is based performs this convenience function and is equipped with a linear capacitive distance sensor which measures distances transverse to its local extent. The distance sensor passes over an elongate sensor region in a longitudinal direction and is accommodated in a rear skirt of the motor vehicle.

The known control system is further equipped with a control arrangement which, as part of an operator control event monitoring process, monitors the distance sensor in order to check whether a predetermined operator control event in the form of an operator control movement cycle is present. In one variant, the operator control movement cycle is a transverse movement cycle in the form of a foot movement in a transverse direction. In response to this operator control event being detected, the closure element arrangement is driven by means of the control arrangement if a longitudinal movement of the operator in the longitudinal direction has additionally been detected. In this way, it is possible to ensure that the operator has already moved out of the region in which there is a risk of collision. The longitudinal movement of the operator is likewise detected by means of the distance sensor. To this end, the distance sensor has a changing sensitivity along a sensor extent.

Although DE 10 2011 112 274 A1 discloses that a longitudinal movement can be detected as an operator control event in principle, this detection serves only to make the motorized operation of the tailgate in response to the detection of the abovementioned transverse movement cycle more reliable.

A similar disclosure is provided by DE 10 2010 002 559 A1 which discloses a distance sensor which is segmented along a sensor extent. As a result of the segmentation, a longitudinal movement of the operator in the longitudinal direction can be detected, and therefore incorrect recordings which are based on such a longitudinal movement can be precluded.

One disadvantage with the known control systems is the fact that the operator has to comply with a relatively strict prespecified operator control movement cycle in order to trigger the desired driving of the respective closure element. This is understood to be a restriction to operator control convenience.

Embodiments of the invention address the problem of designing and developing the known control system in such a way that the operator control convenience can be increased using simple means.

SUMMARY

Embodiments described herein, including control systems and control arrangements, address the above problem.

The consideration that the control arrangement detects a predetermined longitudinal movement cycle, which runs in the longitudinal direction, of a body part of an operator not only as an operator control event as part of the operator control event monitoring process, but rather also performs driving of the closure element arrangement in response to this detection, is firstly important. Therefore, it has been identified in a first step that a longitudinal movement cycle as such is suitable for triggering driving of the closure element arrangement. By way of example, it is feasible to permit a transverse movement cycle additionally in the longitudinal direction and to detect the said transverse movement as an operator control event. As a result, it is no longer necessary for the operator to pay attention to whether he is now executing the prespecified movement cycle in the transverse direction or in the longitudinal direction.

It is further important for the detection of the longitudinal movement cycle of a body part of the operator by sensors to be unproblematic provided that the distance sensor is designed in a certain manner. Specifically, it is proposed to this end that the distance sensor, for the purpose of longitudinal movement detection, has a sensor configuration which changes periodically along the longitudinal direction with a period length, so that the body part of the operator which moves in the longitudinal direction generates changing sensor measurement values of the distance sensor. It is particularly important here that the period length corresponds at least to the extent of the longitudinal movement cycle in the longitudinal direction. This means that a longitudinal movement cycle is located approximately within this period length, and therefore periodically recurring sensor measurement values do not occur on account of the periodically changing sensor configuration. This would lead to ambiguity in the evaluation of the sensor measurement values and make detection of an operator control event complicated. In contrast to this, the longitudinal movement cycle can be detected as an operator control event using simple control-related means here.

As a result, operator control convenience can be implemented with a low level of complexity and therefore in a cost-effective manner with the proposed solution.

The term “sensor configuration” has a broad meaning and includes any parameter which exerts an influence on the sensor measurement values of the distance sensor. Accordingly, the sensor configuration of a distance sensor is based on its geometry, its position, its material composition, any shielding measures or the like.

In an embodiment, the distance sensor runs along the longitudinal direction in an alternating manner around a centerline as part of the changing sensor configuration. An interesting fact in this case is that the sensor configuration can be achieved in an elegant manner by special laying of the distance sensor, without any intervention in the design of the distance sensor itself being necessary. Laying the distance sensor with a wave shape has been found to be particularly advantageous in this connection since the resulting measurement value profiles are comparatively simple to evaluate.

If two distance sensors which run beside one another are provided, an embodiment leads to a further simplification of the evaluation of the sensor measurement values. This is because a time offset between the sensor measurement values of the two distance sensors can be a characteristic of a longitudinal movement cycle, which characteristic can be detected in a particularly simple manner. According to an embodiment, provision is made to this end, for example, to check the time offset between two measurement value pulses of the distance sensors in order to determine whether there is a minimum time offset. If yes, a necessary condition for the detection of the longitudinal movement cycle as the operator control event would be met.

In various embodiments, at least one distance sensor is a capacitive distance sensor. According to various embodiments, the measurement electrode of the distance sensor can be designed as a round conductor and bent into the alternating shape. However, as an alternative, provision may also be made for a distance sensor to be designed as a flat conductor and to be pre-shaped, for example stamped out, into the alternating shape. The alternating shape can be implemented at minimum cost in both cases.

Various embodiments include an alternative for realizing the sensor configuration of the above type which changes along the longitudinal direction. In this case, the distance sensor has an associated shielding arrangement in order to change the capacitive measurement area in sections, this in turn having an effect on the sensor measurement values. In an embodiment, the distance sensor is provided with corresponding shielding metal plates in sections.

Particularly simple detection both of a longitudinal movement cycle and of a transverse movement cycle by sensor is possible in various embodiments. This is because the two movement cycles generate, possibly after standardization, sensor measurement value profiles of a distance sensor with substantially the same signal shapes. In the simplest case, the same identification algorithm can be used for the longitudinal movement cycle and the transverse movement cycle.

Some embodiments providing a distance sensor arrangement are described herein.

The fact that two distance sensors which, for the purpose of longitudinal movement detection, each have a sensor configuration which changes periodically along the longitudinal direction with a period length, so that a body part of the operator which moves in the longitudinal direction generates changing sensor measurement values of the distance sensors, wherein the two distance sensors run parallel to one another, are provided is important for the further teaching. The advantage of the simple evaluation of the sensor measurement values in such a parallel arrangement of the distance sensors has already been discussed further above. However, the minimum period length according to the first-mentioned teaching is irrelevant here.

In an embodiment, a control system for driving a motorized closure element arrangement of a motor vehicle, wherein at least one linear distance sensor, which measures distances transverse to its local extent and passes over an elongate sensor region in a longitudinal direction, is provided in order to detect operator control events in the form of operator movement cycles, wherein, as part of an operator control event monitoring process, a control arrangement monitors the at least one distance sensor in order to check whether a predetermined operator control event is present, wherein a longitudinal movement of a body part of an operator, in particular of a leg of an operator, in the longitudinal direction can additionally be detected by means of the at least one distance sensor, wherein the control arrangement detects a predetermined longitudinal movement cycle, which runs in the longitudinal direction, of a body part of an operator, in particular of a leg of an operator, as an operator control event as part of the operator control event monitoring process and drives the closure element arrangement in response, and in that at least one distance sensor, for the purpose of longitudinal movement detection, has a sensor configuration which changes periodically along the longitudinal direction with a period length, so that the body part of the operator which moves in the longitudinal direction generates changing sensor measurement values of the distance sensor, and in that the period length corresponds at least to the extent of the longitudinal movement cycle in the longitudinal direction, is provided.

In an embodiment, the control arrangement detects a predetermined transverse movement cycle, which runs in a transverse direction, of a body part of an operator, in particular of a leg of an operator, as an operator control event as part of the operator control event monitoring process and drives the closure element arrangement in response.

In an embodiment, the closure element arrangement has a closure element and a drive arrangement which is associated with the closure element, and in that the control arrangement performs driving of the drive arrangement, in particular motorized adjustment of the closure element, depending on the result of the operator control event monitoring process, such as in that the control arrangement performs driving of the drive arrangement, in particular motorized adjustment of the closure element, in response to the detection of the operator control event which is based on the transverse movement cycle as such and also in response to the detection of the operator control event which is based on the longitudinal movement cycle as such.

In an embodiment, the transverse movement cycle and/or the longitudinal movement cycle comprise a forward and backward movement of the body part of the operator.

In an embodiment, the at least one distance sensor runs along the longitudinal direction in an alternating manner around a centerline as part of the changing sensor configuration, such as in that the at least one distance sensor runs along the longitudinal direction with a wave shape, or in that the at least one distance sensor runs along the longitudinal direction with a zigzag shape, or in that the at least one distance sensor runs along the longitudinal direction with a rectangular shape.

In an embodiment, in the installed state, the position of the distance sensor alternates substantially vertically along the longitudinal direction.

In an embodiment, two distance sensors which run parallel to one another are provided, such as in that the two distance sensors are interlaced in one another.

In an embodiment, the longitudinal movement cycle in each case generates a measurement value pulse in the sensor measurement values of the two distance sensors, and in that, as part of the operator control event identification process, a necessary condition for the detection of the longitudinal movement cycle as an operator control event is a minimum time offset between these measurement value pulses.

In an embodiment, at least one distance sensor is designed as a capacitive distance sensor and has a linear measurement electrode by means of which a capacitive measurement area can be generated, such as in that the measurement electrode is designed as a round conductor or as a flat conductor.

In an embodiment, the measurement electrode is designed as a round conductor and is bent into the alternating shape, and/or in that the measurement electrode is designed as a flat conductor and is pre-shaped, in particular stamped out, into the alternating shape.

In an embodiment, a shielding arrangement for shielding sections of the capacitive measurement area is provided in order to generate the sensor configuration, which changes along the longitudinal direction, at least of one distance sensor.

In an embodiment, the shielding arrangement has at least one metal shielding plate, such as in that the metal shielding plate surrounds the respective distance sensor in sections.

In an embodiment, the longitudinal movement cycle and the transverse movement cycle generate, possibly after standardization, sensor measurement value profiles of a distance sensor with substantially the same signal shapes.

In an embodiment, a distance sensor arrangement for a control system for driving a motorized closure element arrangement of a motor vehicle, in particular for a control system as described herein, wherein two linear distance sensors, which measure distances transverse to their local extent and each pass over an elongate sensor region in a longitudinal direction, are provided in order to detect operator control events in the form of operator movement cycles, wherein a longitudinal movement of a body part of an operator, in particular of a leg of an operator, in the longitudinal direction can additionally be detected by means of the distance sensors, wherein the distance sensors, for the purpose of longitudinal movement detection, each have a sensor configuration which changes periodically along the longitudinal direction with a period length, so that a body part of the operator which moves in the longitudinal direction generates changing sensor measurement values of the distance sensors, and wherein the two distance sensors run parallel to one another, is provided.

In an embodiment, the distance sensors each run along the longitudinal direction in an alternating manner around a centerline as part of the changing sensor configuration, such as in that the distance sensors run along the longitudinal direction with a wave shape, or in that the distance sensors run along the longitudinal direction with a zigzag shape, or in that the distance sensors run along the longitudinal direction with a rectangular shape.

BRIEF DESCRIPTION OF THE DRAWINGS

The invention will be explained in greater detail below with reference to the drawings, which illustrate only one exemplary embodiment, and in which.

DETAILED DESCRIPTION

The proposed control system 1 serves to drive a motorized closure element arrangement 2 of a motor vehicle. The closure element arrangement 2 has a closure element 2*a* which is designed as a tailgate.

The design of the closure element 2*a* as a tailgate of a motor vehicle is possible in various embodiments. However, reference may be made to the introductory part of the description in respect of the broad meaning of the term "closure element". In this respect, all of the statements made in relation to a tailgate 2*a* correspondingly apply for all other types of closure elements.

In order to detect operator control events in the form of operator control movement cycles, the control system 1 has at least one linear distance sensor 3, 4 which measures distances transverse to its local extent. This means that the distance from a measurement body is measured transverse to the extent of the distance sensor there, that is to say to the local extent, at any point along the distance sensor 3, 4. A known way of realizing this distance sensor is as capacitive distance sensors having linear measurement electrodes which will be discussed further below.

Figure 3:
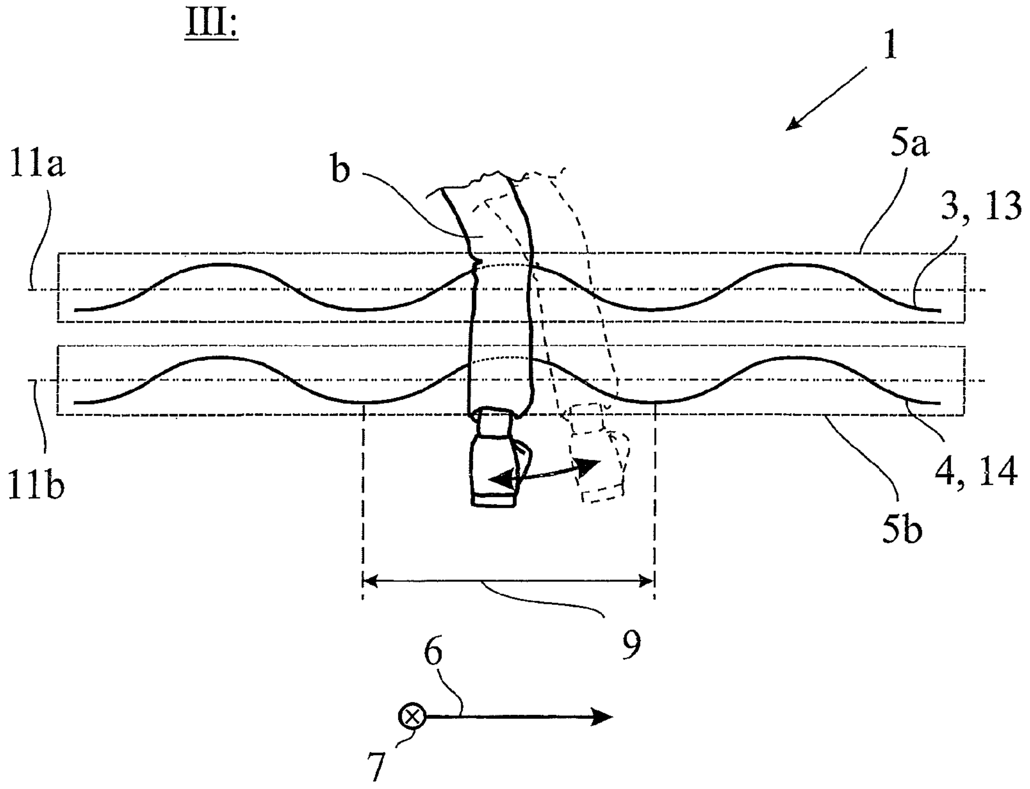
FIG. 3 shows a first embodiment of the two distance sensors of the proposed control system according to FIG. 1.
Figure 4:
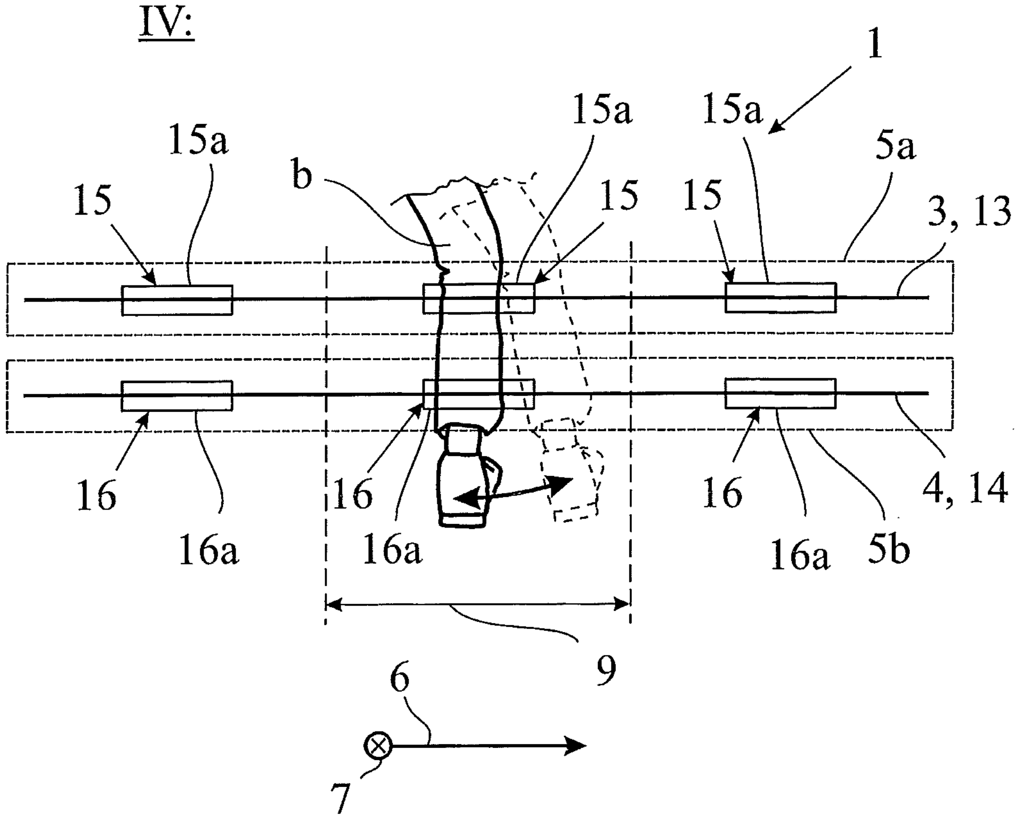
FIG. 4 shows a second embodiment of the two distance sensors of the proposed control system according to FIG. 1.

The at least one distance sensor 3, 4 passes over an elongate sensor region 5*a*, 5*b* in a longitudinal direction 6, as can best be seen from the illustrations according to FIGS. 3 and 4. The sensor region 5*a*, 5*b* can, in principle, be designed to be slightly bent.

The above movement cycles comprise predetermined movements of the operator B, which movements are intended to be detected as operator control events. Said movements can be movements of a body part, in particular of a leg b, of an operator B, as will be explained. The term "linear distance sensor" has a broad meaning in the present case and comprises all distance sensors with an elongate shape. These include, in particular, distance sensors with wire-like measurement electrodes.

The linear distance sensors 3, 4 are provided such that they determine a distance from a measurement body transverse to their respective local extent. This determination process may be the determination of an absolute distance. However, the term "distance sensor" in this case also comprises proximity sensors of a particularly simple design which provide only information about the entry of a measurement body into the detection region of the sensor. The term "distance sensor" also has a broad meaning in this respect.

In principle, only a single distance sensor 3, 4 can be provided. However, in this case, two distance sensors 3, 4 which run beside one another are provided. The associated advantage is explained further below. All of the statements made in relation to the at least one distance sensor 3, 4 correspondingly apply for a plurality of distance sensors, in particular for the two illustrated distance sensors 3, 4.

The illustrations according to FIGS. 3 and 4 show that the distance sensors 3, 4 each pass over an elongate sensor region 5*a*, 5*b* in the longitudinal direction 6. A transverse direction 7 is provided transverse to the longitudinal direction 6.

The control system 1 is equipped with a control arrangement 8 which, as part of an operator control event monitoring process, monitors the at least one distance sensor 3, 4 in order to check whether a predetermined operator control event is present. In the exemplary embodiment which is illustrated, the control arrangement 8 has a central hardware structure. However, it is also feasible for the control arrangement 8 to have a decentralized hardware structure. In this case, some of the control hardware is possibly accommodated in the distance sensor 3, 4. This means that the at least one distance sensor 3, 4 in each case has its own intelligence which can serve, for example, for signal pre-processing.

Operator control event monitoring can firstly take place by means of the measured distance values. In the proposed control system 1, it is additionally the case that a longitudinal movement of a body part of an operator B, in particular of a leg b of an operator B, in the longitudinal direction 6 can additionally be detected by means of the at least one distance sensor 3, 4.

In the case of the proposed solution, it is initially of interest that the control arrangement 8 detects a predetermined longitudinal movement cycle, which runs in the longitudinal direction 6, of a body part of a operator B, here of a leg b of an operator B, as an operator control event as part of the operator control event monitoring process and drives the closure element arrangement 2 in response in a manner yet to be explained. The longitudinal movement cycle as such is therefore already detected as an operator control event and triggers corresponding driving of the closure element arrangement 2.

The proposed manner in which longitudinal movement is detected is also of interest. Specifically, according to the proposal, at least one distance sensor 3, 4, for the purpose of longitudinal movement detection, has a sensor configuration which changes periodically along the longitudinal direction 6 with a period length 9, so that the body part, which moves in the longitudinal direction 6, of the operator B generates changing sensor measurement values of the distance sensor 3, 4. In the present case, "period length" means a distance in the longitudinal direction 6 at which the change in the sensor configuration is repeated. This is best shown in the illustration according to FIG. 3. Reference may be made to the above statements in respect of the broad meaning of the term "sensor configuration".

In the exemplary embodiment illustrated in FIG. 3, the sensor configuration which changes along the longitudinal direction 6 is based on the distance sensor 3, 4 being laid with a wave shape. In the exemplary embodiment illustrated in FIG. 4, the at least one distance sensor 3, 4 is electrically shielded in sections in a manner yet to be explained. In the two exemplary embodiments, the distance sensors 3, 4 are each capacitive distance sensors, as will be explained below.

The final point of interest in the proposed solution is that the period length 9 corresponds at least to the extent of the predetermined longitudinal movement cycle, which is to be detected as an operator control event, in the longitudinal direction 6. This is particularly advantageous in as much as the evaluation of the sensor measurement values requires particularly little expenditure, as has been explained further above.

In addition to the detection of the longitudinal movement cycle as an operator control event, a transverse movement cycle, which runs in a transverse direction 7, of a body part of the operator B, in particular of a leg b of an operator B, can also be detected as an operator control event as part of the operator control event monitoring process, and therefore the closure element arrangement 2 is driven in response to this detection. Here, the longitudinal movement cycle as such and the transverse movement cycle as such, each independently of one another, trigger driving of the closure element arrangement 2.

It should be noted that the longitudinal movement cycle and the transverse movement cycle are defined in the longitudinal direction 6 and, respectively, in the transverse direction 7. However, it should also be noted that an operator movement will always have movement components both in the longitudinal direction 6 and in the transverse direction 7. In this sense, the only important factor for the operator control event monitoring process is whether the respective operator movement comprises the predetermined longitudinal movement cycle.

Figure 1:
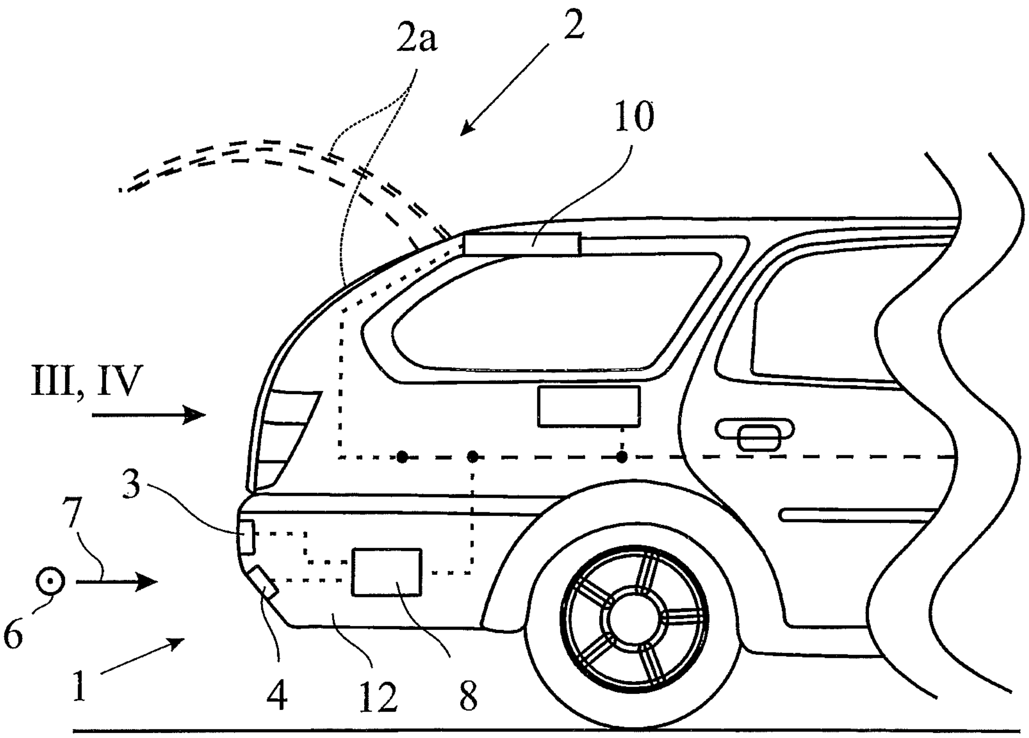
FIG. 1 shows a side view of the rear region of a motor vehicle having a proposed control system.

In an embodiment, the closure element arrangement 2 is, as discussed above, equipped with a closure element 2*a* and a drive arrangement 10 which is associated with the closure element 2*a*. Here, the closure element 2*a* can be adjusted between the closed position, illustrated using a solid line in FIG. 1, and the open position, illustrated using a dashed line in FIG. 1, in a motorized manner by means of the drive arrangement 10. As an alternative, the drive arrangement 10 can also be provided for motorized opening of a motor vehicle lock or the like.

Depending on the result of the operator control event monitoring process, the control arrangement 8 performs driving of the drive arrangement 10, in this case motorized adjustment of the closure element 2*a*. In principle, further actions can additionally be triggered by the control arrangement 8. Provision may further be made for the driving of the drive arrangement 10 and the further actions to be preceded by an authorization check with the operator B.

A particularly high level of operator control convenience can be achieved by the control arrangement 8 in each case performing driving of the drive arrangement 10, here motorized adjustment of the closure element 2*a*, in response to the detection of the operator control event, which is based on the transverse movement cycle, as such and also in response to the detection of the operator control event, which is based on the longitudinal movement cycle, possibly in addition to further actions. This is primarily of interest when the detection of the two operator control events triggers the same driving of the drive arrangement 10, for example the same motorized adjustment of the closure element 2*a*. In this case, the operator B can choose whether he wishes to carry out a longitudinal movement cycle or a transverse movement cycle for the motorized adjustment of the closure element 2*a*.

Figure 2:
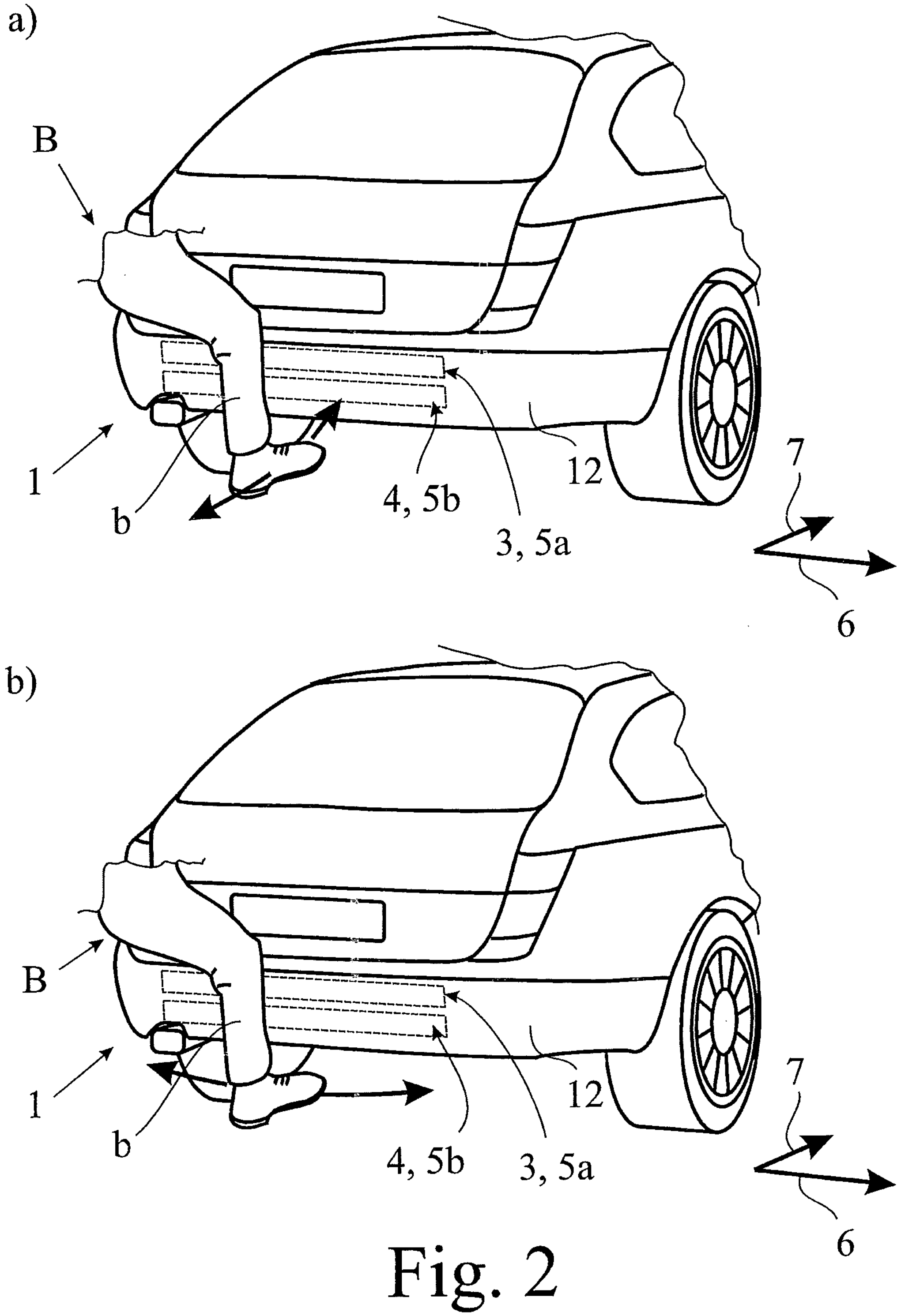
FIG. 2 shows a perspective view of the rear region of the motor vehicle according to FIG. 1 *a*) during a transverse movement cycle and *b*) during a longitudinal movement cycle.

The proposed solution is particularly practical if the transverse movement cycle and/or the longitudinal movement cycle comprise/comprises a forward and backward movement of the body part of the operator B, in particular of the leg b of the operator B. In this case, the transverse movement cycle generally comprises a so-called "kicking movement" in the transverse direction 7, while the longitudinal movement cycle comprises a so-called "wiping movement" in the longitudinal direction 6. The kicking movement in the transverse direction 7 is shown in FIG. 2*a*, while the wiping movement in the longitudinal direction 6 is shown in FIG. 2*b*.

Numerous advantageous variants are feasible for realizing the proposed sensor configuration which changes along the longitudinal direction 6, two variants from amongst the said variants being shown in FIG. 3 and in FIG. 4.

FIG. 3 shows that the at least one distance sensor 3, 4 runs along the longitudinal direction 6 in an alternating manner around a centerline 11*a*, 11*b* as part of the changing sensor configuration. In this case, the centerline 11*a*, 11*b* is oriented in the longitudinal direction 6. Depending on the manner of operation of the distance sensor 3, 4, a profile which alternates in this way has different effects on the sensor measurement values. For example, the alternating profile can result in slight changes in the distance from a measurement body which moves in a longitudinal direction 6 which have an effect on the sensor measurement values. Furthermore, when the distance sensors 3, 4 are designed as capacitive distance sensors, it is the case, for example, that the shape of the respective distance sensor 3, 4 approximates the shape of the measurement body itself sometimes to a greater extent and sometimes to a lesser extent in the case of a measurement body which moves in the longitudinal direction 6, this being accompanied by a corresponding change in the resulting capacitance between the distance sensor 3, 4 and measurement body, and therefore by a change in the sensor measurement values. This appears to be the case provided that the measurement body is a leg b of a user B which is merely indicated in FIGS. 3 and 4.

Numerous variants are feasible for the specific shape of the distance sensor 3, 4 which runs in an alternating manner. Here, the at least one distance sensor 3, 4 runs along the longitudinal direction 6 with the shape of a wave, as shown in FIG. 3. As an alternative to this, the at least one distance sensor 3, 4 can run along the longitudinal direction 6 with a zigzag shape, a rectangular shape or the like.

The at least one distance sensor 3, 4 can be arranged along a rear paneling part 12, here the rear bumper, of the motor vehicle. The at least one distance sensor 3, 4 can run over the entire width of the paneling part 12. If the at least one distance sensor 3, 4 has an alternating profile, it is possible in various embodiments that, in the installed state, the position of the distance sensor 3, 4 alternates substantially vertically along the longitudinal direction 6.

The illustration according to FIG. 3 shows that two distance sensors 3, 4 which run parallel to one another are provided. This means that an elongate, vertically oriented measurement body, which moves in the longitudinal direction 6, generates the same sensor measurement values in both distance sensors 3, 4 if the two distance sensors 3, 4 are otherwise of identical design. An interesting effect which occurs when a leg movement of the operator B is detected can be observed in FIG. 3. Said figure shows that, as a result of the leg b being in a certain inclined position during the abovementioned wiping movement, the two distance sensors 3, 4 are influenced by the leg b of the operator B in different longitudinal positions along the longitudinal direction 6. This leads to the same measurement value pulse being generated in both distance sensors 3, 4, but the said measurement value pulses having a certain time offset. This time offset can be detected particularly easily by the two distance sensors 3, 4 running parallel to one another. This is also possible when the two distance sensors 3, 4 are interlaced in one another. However, in the exemplary embodiment which is illustrated in FIG. 3, the two distance sensors 3, 4, are not interlaced in one another in order to prevent the distance sensors 3, 4 from influencing one another.

The above time offset can, in addition to other evaluation criteria, represent a necessary condition for detecting the longitudinal movement cycle as the operator control event. Specifically, it is possible the case that the longitudinal movement cycle in each case generates a measurement value pulse in the sensor measurement values of the two distance sensors 3, 4, and that, as part of the operator control event identification process, a necessary condition for the detection of the longitudinal movement cycle as an operator control event is a minimum time offset between the measurement value pulses of the distance sensors 3, 4.

In an embodiment, at least one distance sensor 3, 4 is designed as a capacitive distance sensor. Here, the two distance sensors 3, 4 are capacitive distance sensors. Accordingly, the two distance sensors 3, 4 each have a linear measurement electrode 13, 14 by means of which a capacitive measurement area can be generated. The distance measurement is based on the detection of a change in capacitance which accompanies the insertion of a measurement body into the measurement area. Different designs of the at least one measurement electrode 13, 14 are feasible depending on structural and electrotechnical boundary conditions. Measurement electrodes which are designed as round conductors or as flat conductors have proven particularly expedient in practice.

If the at least one measurement electrode 13, 14 is designed as a round conductor, the measurement electrode 13, 14 can be bent into the abovementioned, alternating shape in a particularly simple manner. As a result, standard starting material can readily be used for the at least one measurement electrode 13, 14. If the measurement electrode 13, 14 is designed as a flat conductor, provision may be made for the measurement electrode 13, 14 to be preformed, in particular stamped out, into the alternating shape during the course of its production. Optimum homogeneity of the material of the measurement electrode 13, 14 can be ensured in this way.

Another variant for generating the sensor configuration, which changes along the longitudinal direction 6, of the at least one distance sensor 3, 4 is based on the at least one distance sensor 3, 4 being shielded in sections along the longitudinal direction 6. Specifically, it is proposed that a shielding arrangement 15, 16 for shielding at least sections of the capacitive measurement area is provided in order to generate the sensor configuration, which changes along the longitudinal direction 6, at least of one distance sensor 3, 4. Owing to a shielding arrangement 15, 16 of this kind, the capacitive measurement area can be modulated to a certain extent along the longitudinal direction 6, this in turn having a corresponding effect on the sensor measurement values. The shielding arrangement 15, 16 can have, for example, a metal shielding plate 15*a*, 16*a* which, in an embodiment, surrounds the respective distance sensor 3, 4 in sections. Numerous variants are feasible for the design of the metal shielding plate 15*a*, 16*a*. By way of example, the metal shielding plate 15*a*, 16*a* can at least partially surround the respective distance sensor 3, 4 substantially in the manner of a basket. FIG. 4 schematically shows an embodiment. One special feature here is that the shielding arrangement 15, 16 is arranged on that side of the measurement electrode 13, 14 which is averted from the operator B. It may be advantageous to couple, in particular to connect, the shielding arrangement 15, 16 to the electrical earth of the vehicle.

An embodiment of the control system 1 involves the longitudinal movement cycle and the transverse movement cycle generating, possibly after standardization of the sensor measurement values, sensor measurement value profiles in a distance sensor 3, 4 with substantially the same signal shapes. This means that the longitudinal movement cycle generates, in the distance sensor 3, 4, a sensor measurement value profile which is identical to the sensor measurement value profile which is generated by the transverse movement cycle in this distance sensor 3, 4, possibly subject to standardization of the sensor measurement values. This can apply for both distance sensors 3, 4 illustrated here. As a result, it is possible for the same evaluation algorithm to be used in order to detect the longitudinal movement cycle and the transverse movement cycle as an operator control event.

A distance sensor arrangement for a control system 1 for driving a motorized closure element arrangement 2 of a motor vehicle is described herein.

Two linear distance sensors 3, 4, which measure distances transverse to their local extent and each pass over an elongate sensor region 5*a*, 5*b* in a longitudinal direction 6, are provided in order to detect operator control events in the form of operator movement cycles. A longitudinal movement of a body part of an operator B, in particular of a leg b of an operator B, in the longitudinal direction 6 can also be detected by means of the distance sensors 3, 4. The distance sensors 3, 4, for the purpose of longitudinal movement detection, each have a sensor configuration which changes periodically along the longitudinal direction 6 with a period length 9, so that a body part of the operator B which moves in the longitudinal direction generates changing sensor measurement values of the distance sensors 3, 4. The fact that the two distance sensors 3, 4 run parallel to one another, so that the evaluation of the sensor measurement values is simplified, as discussed above, is important here. However, the minimum period length according to the first-mentioned teaching is irrelevant here.

A design in which the two distance sensors 3, 4 run in an alternating manner around a centerline 11*a*, 11*b* is particularly advantageous within the scope of the further teaching. The wave-shaped profile of the distance sensors 3, 4 discussed above is of particular importance here.

Reference may be made to all of the statements made in relation to the design of the distance sensors 3, 4 which are suitable for explaining the distance sensor arrangement.

What is claimed is:

1. A control system configured for driving a motorized closure element arrangement of a motor vehicle, comprising:

at least one linear distance sensor, which measures distances transverse to its local extent and passes over an elongate sensor region in a longitudinal direction, wherein the at least one linear distance sensor is configured to detect operator control events in the form of operator movement cycles; and a control arrangement configured to monitor the at least one distance sensor, as part of an operator control event monitoring process, in order to check whether a predetermined operator control event is present, wherein a longitudinal movement of a body part of an operator in the longitudinal direction can additionally be detected by the at least one distance sensor, wherein the control arrangement detects a predetermined longitudinal movement cycle, which runs in the longitudinal direction of a body part of an operator as an operator control event as part of the operator control event monitoring process, and drives the closure element arrangement in response, wherein the at least one distance sensor, for the purpose of longitudinal movement detection, has a sensor configuration which changes periodically along the longitudinal direction with a period length, so that the body part of the operator which moves in the longitudinal direction generates changing sensor measurement values of the distance sensor, and wherein the period length corresponds at least to the extent of the longitudinal movement cycle in the longitudinal direction.

2. A control system according to claim 1, wherein the control arrangement detects a predetermined transverse movement cycle, which runs in a transverse direction, of a body part of an operator as an operator control event as part of the operator control event monitoring process and drives the closure element arrangement in response.

3. A control system according to claim 1, wherein the closure element arrangement has a closure element and a drive arrangement which is associated with the closure element, and wherein the control arrangement performs driving of the drive arrangement depending on the result of the operator control event monitoring process.

4. A control system according to claim 1, wherein the transverse movement cycle and/or the longitudinal movement cycle comprises a forward and backward movement of the body part of the operator.

5. A control system according to claim 1, wherein the at least one distance sensor runs along the longitudinal direction in an alternating manner around a centerline as part of the changing sensor configuration.

6. A control system according to claim 5, wherein, in the installed state, the position of the distance sensor alternates substantially vertically along the longitudinal direction.

7. A control system according to claim 1, further comprising two distance sensors which run parallel to one another.

8. A control system according to claim 1, wherein the longitudinal movement cycle in each case generates a measurement value pulse in the sensor measurement values of the two distance sensors, and wherein, as part of the operator control event identification process, a necessary condition for the detection of the longitudinal movement cycle as an operator control event is a minimum time offset between these measurement value pulses.

9. A control system according to claim 1, wherein the at least one distance sensor is designed as a capacitive distance sensor and has a linear measurement electrode by which a capacitive measurement area can be generated.

10. A control system according to claim 9, wherein the measurement electrode is designed as a round conductor and is bent into the alternating shape, and/or wherein the measurement electrode is designed as a flat conductor and is pre-shaped into the alternating shape.

11. A control system according to claim 9, wherein a shielding arrangement for shielding sections of the capacitive measurement area is provided in order to generate the sensor configuration, which changes along the longitudinal direction, at least of one distance sensor.

12. A control system according to claim 11, wherein the shielding arrangement has at least one metal shielding plate.

13. A control system according to claim 1, wherein the longitudinal movement cycle and the transverse movement cycle generate sensor measurement value profiles of a distance sensor with substantially the same signal shapes.

14. A distance sensor arrangement for a control system configured for driving a motorized closure element arrangement of a motor vehicle, comprising two linear distance sensors, which are configured to measure distances transverse to their local extent and each pass over an elongate sensor region in a longitudinal direction, wherein the two linear distance sensors are configured to detect operator control events in the form of operator movement cycles, wherein a longitudinal movement of a body part of an operator in the longitudinal direction can additionally be detected by the distance sensors, wherein the distance sensors, for the purpose of longitudinal movement detection, each have a sensor configuration which changes periodically along the longitudinal direction with a period length, so that a body part of the operator which moves in the longitudinal direction generates changing sensor measurement values of the distance sensors, and wherein the two distance sensors run parallel to one another.

15. The distance sensor arrangement according to claim 14, wherein the distance sensors each run along the longitudinal direction in an alternating manner around a centerline as part of the changing sensor configuration.

16. A control system according to claim 3, wherein the control arrangement performs driving of the drive arrangement in response to the detection of the operator control event which is based on the transverse movement cycle as such and also in response to the detection of the operator control event which is based on the longitudinal movement cycle as such.

17. A control system according to claim 5, wherein the at least one distance sensor runs along the longitudinal direction with a wave shape, or wherein the at least one distance sensor runs along the longitudinal direction with a zigzag shape, or wherein the at least one distance sensor runs along the longitudinal direction with a rectangular shape.

18. A control system according to claim 7, wherein the two distance sensors are interlaced in one another.

19. A control system according to claim 9, wherein the measurement electrode is designed as a round conductor or as a flat conductor.

20. A control system according to claim 12, wherein the metal shielding plate surrounds the respective distance sensor in sections.

* * * * *